(12) United States Patent
Shi et al.

(10) Patent No.: US 8,737,540 B1
(45) Date of Patent: May 27, 2014

(54) SYSTEM AND METHOD FOR PROVIDING REDUCED COMPLEXITY MAXIMUM LIKELIHOOD MIMO DETECTION

(75) Inventors: Kai Shi, Sunnyvale, CA (US); Felix Bitterli, San Jose, CA (US); Richard Mosko, Santa Clara, CA (US); Tao-Fei Samuel Ng, Fremont, CA (US)

(73) Assignee: Qualcomm Atheros, Inc., San Jose, CA (US)

( * ) Notice: Subject to any disclaimer, the term of this patent is extended or adjusted under 35 U.S.C. 154(b) by 325 days.

(21) Appl. No.: 13/184,464

(22) Filed: Jul. 15, 2011

(51) Int. Cl.
*H04L 27/06* (2006.01)

(52) U.S. Cl.
USPC .......................................................... 375/340

(58) Field of Classification Search
USPC .................. 375/262, 265, 267, 316, 340–341; 714/794–795
See application file for complete search history.

(56) References Cited

U.S. PATENT DOCUMENTS

| 7,289,585 | B2 * | 10/2007 | Sandhu et al. | 375/347 |
|---|---|---|---|---|
| 7,489,746 | B1 * | 2/2009 | Awater et al. | 375/341 |
| 7,720,169 | B2 * | 5/2010 | Reuven et al. | 375/267 |
| 8,121,220 | B1 | 2/2012 | Shi et al. | |
| 2009/0028265 | A1 * | 1/2009 | Lee et al. | 375/267 |

* cited by examiner

*Primary Examiner* — Khanh C Tran
(74) *Attorney, Agent, or Firm* — Bay Area Technology Law Group PC

(57) ABSTRACT

This disclosure is directed to wireless or wired multiple-input multiple-output communication systems, in which a transmit symbol vector and a set of soft decision metrics are estimated using a reduced complexity maximum likelihood (ML) detection method based on a receive symbol vector and a QR decomposition of a set of permuted channel matrices. The QR decomposition can be performed by a series of CORDIC operations. Preferably, the modified receive vector and upper triangular matrix streams are scaled by a weighting vector to help compensate for transmit and receive side noise. Also preferably, the soft decision metric set related to the reliability of transmitted bits is normalized.

18 Claims, 2 Drawing Sheets

SYSTEM AND METHOD FOR PROVIDING REDUCED COMPLEXITY MAXIMUM LIKELIHOOD MIMO DETECTION

FIELD OF THE PRESENT INVENTION

The present disclosure generally relates to wireless communications and more particularly relates to systems and methods for providing reduced complexity maximum likelihood detection in wired or wireless multiple-input multiple-output (MIMO) communication systems.

BACKGROUND OF THE INVENTION

To increase the transmission capacity and spectral efficiency of wireless or wired communication, various standards have proposed MIMO transmission schemes that use an array of transmit and receive antennas or lines to carry multiple independent spatial streams simultaneously and in the same bandwidth. Each of the separate transmit signals may be detected jointly from a set of receive signals using an optimal maximum likelihood (ML) detection scheme; however, the complexity of a complete exhaustive search ML detection method tends to increase exponentially with the number of spatial streams and the size of the signal constellation. As such, some implementations may limit MIMO detection to a sub-optimal search over a space of possible solutions that may require fewer computations but also may result in lower performance.

Example sub-optimal MIMO detection algorithms include linear zero-forcing (ZF) and minimum mean-squared-error (MMSE) receivers that may multiply the receive signals by an inverse of the channel response to cancel the interference effect of the channel, thereby extracting the separate transmit signals from the composite receive signals. While more computationally efficient than ML detection, such algorithms may amplify the additive noise reducing the performance of the system. Another sub-optimal MIMO algorithm may use non-linear decision feedback detection to decide each of the transmitted signals sequentially, thereby cancelling the interference of each detected transmit symbol successively from the composite received signal; however, incorrect decisions may propagate through the detection process resulting again in reduced performance.

Another sub-optimal non-linear detection algorithm, known as K-best sphere decoding, may perform a non-exhaustive search for the transmitted signal by limiting the number of candidate solutions kept after each stage of a multiple stage search. For each stage, K candidate solutions resulting from the previous stage may be extended to K*M candidate solutions, where M may equal the size of the signal constellation, and a cumulative metric may be calculated for each of the resulting K*M candidate solutions. The K*M candidate solutions may then be sorted by the cumulative metric, with only the "best" K candidate solutions retained for the next stage of calculation. While the number of total computations for non-exhaustive K-best sphere decoding may grow more slowly than exhaustive ML detection, the sorting process may require significant memory and may lack parallelism to speed the operation in chip implementations.

In addition to a hard decision detection result, i.e. a "best" estimate of the transmit symbols, wireless MIMO communication systems may use error correction codes requiring a soft decision reliability metric for each bit of the estimated transmit symbols. Because the K-best sphere decoding algorithm limits the search space, the set of candidate solutions at the final stage may not contain candidates for each possible bit value (0 or 1) in the set of estimated transmit symbols needed for a soft decision reliability metric to input to a subsequent error correction decoder.

Thus, there exists a need for a reduced complexity maximum likelihood MIMO detection scheme that may provide near optimal performance, may parallelize for efficient implementation, and may provide both hard decision and soft decision results for a wireless MIMO communication system. Similarly, there is a need for such schemes that may employ readily implemented QR decomposition functions.

SUMMARY OF THE INVENTION

In accordance with the above needs and those that will be mentioned and will become apparent below, this disclosure is directed to a method for estimating a plurality of transmit symbols $s_i$, i=1 to n, in a transmit symbol vector s of a multiple-input multiple-output (MIMO) communication system, where n is the size of the transmit symbol vector s, the method including calculating a plurality of permuted MIMO channel matrices $H_i$, i=1 to n, wherein a rightmost column of the permuted MIMO channel matrix $H_i$ is an ith column of an estimated MIMO channel matrix H, determining a QR decomposition by rotation of each permuted MIMO channel matrix $H_i$ in the plurality of permuted MIMO channel matrices $H_i$, i=1 to n, to generate a plurality of unitary matrices $Q_i$, i=1 to n, and a plurality of upper triangular matrices $R_i$, i=1 to n, having real values along each diagonal, and estimating each transmit symbol $s_i$, i=1 to n, of the transmit symbol vector s using a modified receive symbol vector $y_i$ and the upper triangular matrix $R_i$.

In one embodiment, the step of determining a QR decomposition includes performing a series of CORDIC operations. Preferably, rotations for each CORDIC operation are stored. In such embodiments, a plurality of modified receive symbol vectors $y_i$, i=1 to n, can be determined, wherein each modified receive symbol vector $y_i$ is calculated by rotating receive symbol vector z by the stored rotations of each CORDIC operation. Also preferably, the step of determining a QR decomposition includes applying each QR decomposition serially to all frequency bins of a plurality of data streams.

A first aspect of the disclosure includes the steps of calculating a LLR scaling factor and applying the scaling factor to a soft decision metric set representative of estimated received bit reliability. For example, this step can involve saturating a maximum bit distance.

Another aspect of the disclosure includes scaling the modified receive symbol vectors $y_i$ and the upper triangular matrices $R_i$ by a weighting vector w configured to compensate for an effect of noise in the MIMO system. The weighting vector w can weight the estimation of the transmit symbol vector s towards a ML equalization when the noise is predominantly present on a receive side of the MIMO system and/or towards a ZF equalization when the noise is predominantly present on a transmit side of the MIMO system.

This disclosure is also directed to an apparatus for estimating a plurality of transmit symbols $s_i$, i=1 to n, in a transmit symbol vectors of a multiple-input multiple-output (MIMO) communication system, where n is the size of the transmit symbol vector s, the apparatus including a permutation processor to calculate a plurality of permuted MIMO channel matrices $H_i$, i=1 to n, wherein a rightmost column of the permuted MIMO channel matrix $H_i$ is an ith column of an estimated MIMO channel matrix H, a decomposition processor to determine a QR decomposition by rotation of each permuted MIMO channel matrix $H_i$ in the plurality of permuted MIMO channel matrices $H_i$, i=1 to n, to generate a plurality of unitary matrices $Q_i$, i=1 to n, and a plurality of upper triangular matrices $R_i$, i=1 to n, having real values along each diagonal, and an estimator to estimate each transmit symbol $s_i$, i=1 to n, of the transmit symbol vector s using a modified receive symbol vector $y_i$ and the upper triangular matrix $R_i$.

Preferably, the decomposition processor performs a series of CORDIC operations. The decomposition processor can also be configured to store rotations for each CORDIC operation. Such embodiments preferably include a calculator to determine a plurality of modified receive symbol vectors $y_i$, i=1 to n, wherein each modified receive symbol vector $y_i$ is calculated by rotating receive symbol vector z by the stored rotations of each CORDIC operation.

In one aspect, the decomposition processor applies each QR decomposition serially to all frequency bins of a plurality of data streams.

According to the disclosure, the apparatus can also include a LLR scaling factor calculator to determine a LLR scaling factor and apply the LLR scaling factor to a soft decision metric set representative of estimated received bit reliability. Preferably, the LLR scaling factor calculator determines a LLR scaling by saturating a maximum bit distance.

In yet another aspect, the calculator is preferably configured to scale the modified receive symbol vectors $y_i$ and the upper triangular matrices $R_i$ by a weighting vector w that compensates for an effect of noise in the MIMO system. Accordingly, the weighting vector w weights the estimation of the transmit symbol vector s towards a ML equalization when the noise is predominantly present on a receive side of the MIMO system and/or towards a ZF equalization when the noise is predominantly present on a transmit side of the MIMO system.

BRIEF DESCRIPTION OF THE DRAWINGS

Further features and advantages will become apparent from the following and more particular description of the preferred embodiments of the invention, as illustrated in the accompanying drawings, and in which like referenced characters generally refer to the same parts or elements throughout the views, and in which.

DETAILED DESCRIPTION OF THE INVENTION

Figure 1:
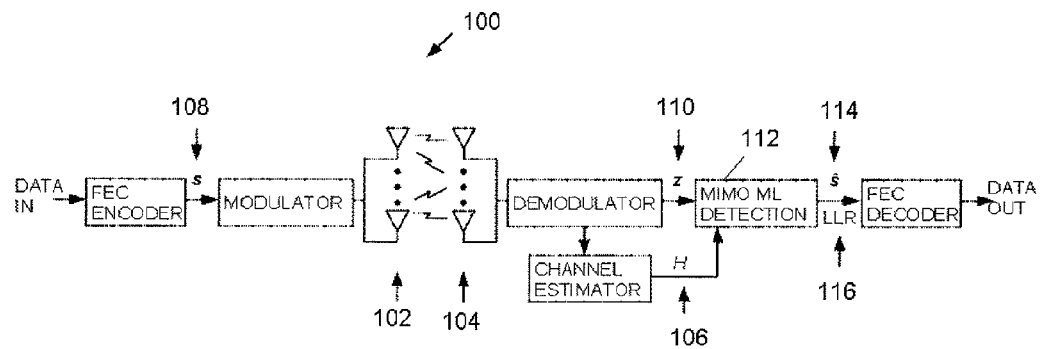
FIG. 1 illustrates a multiple-input multiple-output (MIMO) communication system including a maximum likelihood (ML) detection block, according to the invention.

At the outset, it is to be understood that this disclosure is not limited to particularly exemplified materials, architectures, routines, methods or structures as such may, of course, vary. Thus, although a number of such option, similar or equivalent to those described herein, can be used in the practice of embodiments of this disclosure, the preferred materials and methods are described herein.

It is also to be understood that the terminology used herein is for the purpose of describing particular embodiments of this disclosure only and is not intended to be limiting.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal.

In the figures, a single block may be described as performing a function or functions; however, in actual practice, the function or functions performed by that block may be performed in a single component or across multiple components, and/or may be performed using hardware, using software, or using a combination of hardware and software. Also, the exemplary transmission and receiving stations may include components other than those shown, including well-known components such as a processor and memory and perhaps audio and visual components.

Unless defined otherwise, all technical and scientific terms used herein have the same meaning as commonly understood by one having ordinary skill in the art to which the disclosure pertains.

Further, all publications, patents and patent applications cited herein, whether supra or infra, are hereby incorporated by reference in their entirety.

Finally, as used in this specification and the appended claims, the singular forms "a," "an" and "the" include plural referents unless the content clearly dictates otherwise.

As discussed above, this disclosure is directed to a MIMO wireless or wired network system 100 with n transmit antennas or lines 102 and m receive antennas or lines 104, carrying up to n or m separate spatial streams (whichever is smaller), in which the transmission and reception of signals may be represented by the set of linear equations $$z = Hs + v \quad (1)$$

where H may be an m×n channel matrix 106, $s=[s_1 \ldots s_n]^T$ corresponds to an n×1 column vector 108 of n complex-valued transmit symbols, 2q bits each, $z=[z_1 \ldots z_m]^T$ corresponds to an m×1 column vector 110 of complex-valued receive symbols, and v corresponds to an m×1 column vector of complex-valued additive white Gaussian noise. Each complex-valued transmit symbol $s_i$ in the transmit symbol vector 108 s is taken from a QAM constellation C of size M, i.e. the transmit symbol vector 108 s is taken from the 2n-dimensional constellation $C \times C \ldots \times C = C^n$. In some embodiments, the channel matrix 106

$$H = \begin{bmatrix} h_{1,1} & \ldots & \ldots & h_{1,n} \\ \ldots & \ldots & & \ldots \\ \ldots & & \ldots & \\ h_{m,1} & \ldots & \ldots & h_{m,n} \end{bmatrix} \quad (2)$$

contains a complex-valued channel response $h_{i,j}$ that represents a channel transfer characteristic between the $j^{th}$ transmit antenna or lines and the $i^{th}$ receive antenna or lines; while in other embodiments the channel matrix H 106 contains an "equivalent" complex-valued channel response $h_{i,j}$ that represents a combined signal processing and channel transfer characteristic connecting the $j^{th}$ transmit symbol to the $i^{th}$ receive symbol. In a 2×2 MIMO communication system, for example, the sum of the first and second symbol may be transmitted by one antenna or line, and the difference of the first and second symbol may be transmitted by the other antenna or line. Preferably, channel matrix H 106 is estimated at the receiver by a number of known techniques, including the use of a high throughput long training field (HT-LTF) in 802.11n standard and the use of a very high throughput long training field (VHT-LTF) in 802.11ac standard.

A MIMO maximum likelihood (ML) detector 112 at the receiver determines an estimate of the transmit symbol vector 114 ŝ by maximizing P(s=ŝ|z), the probability that the transmit symbol vector 108 s equals the estimated transmit symbol vector 114 ŝ given the receive symbol vector 110 z. Preferably, ML detector 112 also includes log likelihood ratio (LLR) calculation function that determines a soft decision metric 116, i.e. a reliability metric, for each bit $x_k$ in the estimated transmit symbol $\hat{s}_n$. For a square constellation C of size $M=2^{2q}$, each estimated transmit symbol $\hat{s}_n$ contains q "in-phase" bits and q "quadrature" bits, resulting in a soft decision metric set of 2qn.

For the MIMO system 100 described by equation (1), a conventional exhaustive search maximum likelihood (ML) algorithm typically searches over all possible 2n-dimensional constellation points in $C^n$ for the point that minimizes the error distance between the actual receive symbol vector 110 z and an estimated receive symbol vector Hŝ.

$$\operatorname*{argmin}_{\hat{s} \in C^n} \|z - H\hat{s}\|^2 \quad (3)$$

The complexity of such an exhaustive "brute force" search for the estimated transmit symbol vector 114 ŝ depends exponentially on the number of spatial streams and the size of the signal constellation C. As will be appreciated, a complete ML determination rapidly becomes impractical as the size of the constellation or number of spatial streams increase. As a result, it is preferable to decrease the complexity of the ML determination.

As is known in the art, a number of computations associated with ML detection can be reduced or simplified by decomposing the channel matrix H, including the determination of the error distance. For example, a QR decomposition of H=QR in which Q is an m×m unitary orthogonal matrix, Q* is the conjugate transpose of Q such that Q*Q=I, and R is an m×n upper triangular matrix with diagonal elements containing positive real numbers. While the QR decomposition of the channel matrix 106 H may not be unique, preferentially, some embodiments use a QR decomposition in which the diagonal elements of R are positive and real valued as discussed below. In embodiments where the number of receive antennas or lines m>n exceeds the number of transmit antennas or lines, the last m−n rows of R can be zero. A modified receive symbol vector y can be obtained by left multiplying receive vector z by Q*. In turn, this allows the error distance equation (3) to be rewritten as $$\operatorname*{argmin}_{\hat{s} \in C^n} \|y - R_1 \hat{s}\|^2 \quad (4)$$

Further, because $R_1$ preferably comprises an n×n upper triangular matrix, equation (4) has the following equivalency $$\operatorname*{argmin}_{\hat{s} \in C^n} \|y - R_1 \hat{s}\|^2 = \sum_{i=1}^{n} \left\| y_i - \sum_{j=i}^{n} r_{i,j} \hat{s}_j \right\|^2 \equiv \sum_{i=1}^{n} ed_i(\hat{s}_i, \ldots, \hat{s}_n) = ED(\hat{s}) \quad (5)$$

where $y_i$ denotes the $i^{th}$ entry in a modified receive symbol vector y, $r_{i,j}$ denotes the entry in the $i^{th}$ row and $j^{th}$ column of the matrix $R_1$ and $\hat{s}_j$ denotes the $j^{th}$ entry in the estimated transmit symbol vector 114 ŝ. As an example application of this process, MIMO ML detection block 112 can include the functional blocks shown in FIG. 2 which shows the QR decomposer 202 factoring channel matrix 106 into unitary m×m matrix $Q_1$ 204 and upper triangular matrix $R_1$ 206. As described above, modified receive symbol vector y 208 is generated by multiplying receive vector z 110 by the conjugate transpose of $Q_1$ 204. ML detector 210 can then perform the minimization of error distance using the determined y 208 and $R_1$ 206 as well as determining LLR 116.

At the $i^{th}$ stage of an iterative detection process, an incremental error distance metric $ed_i(\hat{s}_i, \ldots \hat{s}_n)$ depends on a current transmit symbol to be estimated $\hat{s}_i$ and on all previous decisions of estimated transmit symbols $\hat{s}_{i+1}$ to $\hat{s}_n$. A maximum likelihood algorithm preferably minimizes a total error distance metric $ED(\hat{s})$, which preferably is the sum of the n incremental error distance metrics, with one incremental metric calculated at each stage of an iterative detection process.

Figure 3:
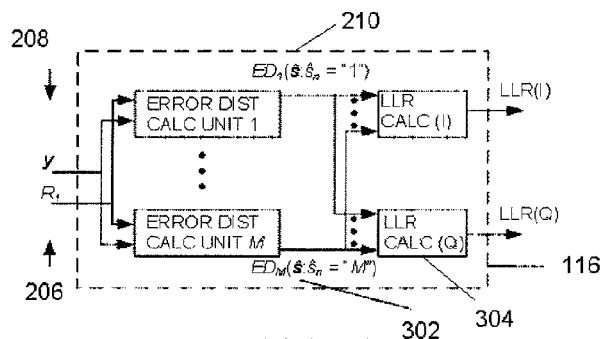
FIG. 3 illustrates a simplified ML detector using a set of parallel error distance calculation units, according to the invention.

As the first estimated transmit symbol $\hat{s}_n$ typically affects all subsequent transmit symbol estimates $\hat{s}_{n-1}$ to $\hat{s}_1$, in some embodiments of the invention, all possible values for the estimate of the $n^{th}$ transmit symbol $\hat{s}_n$ may be examined in the first stage and may be retained in all subsequent stages of detection to ensure a higher probability of propagating a correct decision throughout the detection process. FIG. 3 illustrates this concept detailing a simplified ML detector 210 using multiple values for the $n^{th}$ estimated transmit symbol $\hat{s}_n$. Rather than limit the maximum likelihood search to a single value for the $n^{th}$ estimated transmit symbol $\hat{s}_n$, as done in conventional successive interference calculation detection methods, up to a total of M parallel error distance calculation units (EDCUs) 302 may be used, each one of the EDCUs 302 starting with one of the possible values of the $n^{th}$ estimated transmit symbol $\hat{s}_n$. Similarly, M parallel LLR calculation blocks 304 are used to generate the LLR soft decision metric set 116.

Figure 4:
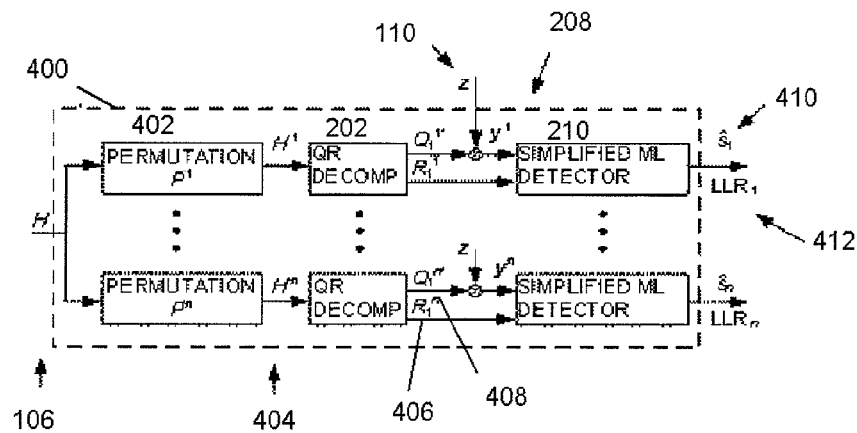
FIG. 4 illustrates a ML detection block using a set of parallel simplified ML detectors and QR decompositions of a set of permuted estimated channel matrices, according to the invention.

Further optimization of the ML determination can be achieved performing n parallel maximum likelihood searches, each search starting with a different estimated transmit symbol $\hat{s}$. As shown in FIG. 4, the function of ML detector 112 is reproduced by a series 400 of n parallel detectors 402 in which H 106 is permuted into n channel matrices $H^k$ 404 for k=1 to n, each of which is subjected to QR decomposition by QR decomposers 202 into respective unitary matrices $Q^k$ 406 and triangular matrices $R^k$ 408. The resulting series of estimated transmit symbols $\hat{s}_k$ 410 and LLR soft decision metrics 412 can be aggregated into the vector $\hat{s}$ and LLR set 116. As will be appreciated, this guarantees that soft decision metrics for all estimated transmit symbols are available. Accordingly, an error distance calculated by the $j^{th}$ EDCU 302 within the simplified ML detector 310 using the permuted channel matrix 402 $H^k$ may determine a minimum error distance for a permuted estimated transmit symbol vector $\hat{s}^k$ with an estimated transmit symbol $\hat{s}_k$ equal to the "$j^{th}$" symbol, denoted as $\sigma_j$, in the constellation.

Further details regarding ML determinations involving QR decompositions, particularly in the context of performing parallel error distance calculations using multiple potential estimated transmit symbols and/or multiple permuted channel matrices, can be found in commonly-owned U.S. patent application Ser. No. 12/135,054, filed Jun. 6, 2008, which is hereby incorporated by reference in its entirety.

Therefore, the type of QR decomposition can be seen to have a significant impact on the complexity of the ML determination. In a preferred aspect of this disclosure, the QR decomposition function uses techniques that are readily implemented using VLSI components. As will be recognized, this simplifies the structure of ML detector 210. Also preferably, the QR decomposition involves rotating H to generate R such that the diagonal elements of R are real and positive. In some embodiments, this is implemented using known coordinate rotation digital computer (CORDIC) algorithms.

Figure 5:
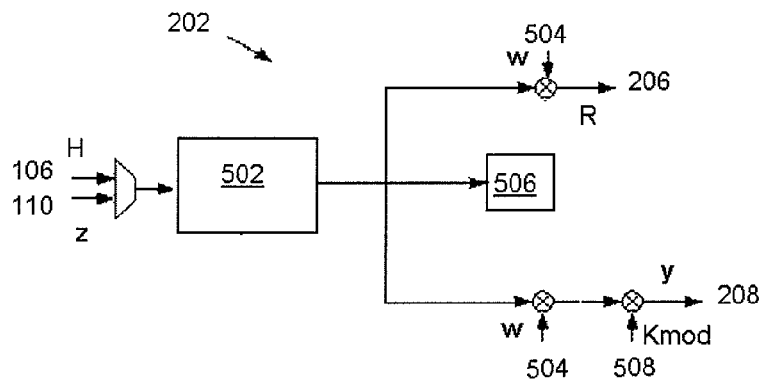
FIG. 5 illustrates a QR decomposition block having stream scaling and bit LLR normalization, according to the invention.

FIG. 5 shows a schematic representation of QR decomposer 202, which receives as inputs channel matrix H 106 and received symbol vector z 110. Decomposition block 502 rotates H as necessary to generate real numbers along the diagonal and zero values in the lower left quadrant of the matrix, generating upper right triangular matrix R 206. When using CORDIC rotations, the diagonal values are also positive. As described below, the necessary CORDIC rotations depend upon the size of the channel matrix H 106, corresponding to the number of transmit and receive antennas or lines. As indicated by FIG. 5, the QR decomposition performed by block 402 is first used to determine R 206. During this process, the sign bits of the CORDIC rotation are saved in memory and then applied to perform the multiplication of received symbol vector z 110 to generate y 208. By reusing this QR decomposition information, the use of a complex multiplier is avoided. This implementation also allows QR decomposition block 502 to be applied serially to all the frequency bins of each stream of z 110.

For a 2×2 MIMO system, the QR decomposition is preferably accomplished by the following three rotations:

$$\begin{bmatrix} e^{i\theta_1} & 0 \\ 0 & e^{i\theta_2} \end{bmatrix} \begin{bmatrix} h_{11} & h_{12} \\ h_{21} & h_{22} \end{bmatrix} = \begin{bmatrix} h'_{11} & h'_{12} \\ h'_{21} & h'_{22} \end{bmatrix} \quad (6)$$

$$\begin{bmatrix} \cos(\theta_3) & \sin(\theta_3) \\ -\sin(\theta_3) & \cos(\theta_3) \end{bmatrix} \begin{bmatrix} h'_{11} & h'_{12} \\ h'_{21} & h'_{22} \end{bmatrix} = \begin{bmatrix} r_{11} & 0 \\ 0 & r'_{22} \end{bmatrix} \quad (7)$$

$$\begin{bmatrix} 1 & 0 \\ 0 & e^{i\theta_4} \end{bmatrix} \begin{bmatrix} r_{11} & r_{12} \\ 0 & r'_{22} \end{bmatrix} = \begin{bmatrix} r_{11} & r_{12} \\ 0 & r_{22} \end{bmatrix} \quad (8)$$

Equation 6 represents the rotation of the left column of H to real numbers. To maintain the unitary nature of the matrix, the same rotation is applied within each row. In turn, equation 7 represents the rotation of the result from equation 6 to generate the right triangular matrix with a value of zero in the lower left quadrant. Finally, equation 8 represents the rotation to real for the last value in the diagonal of the triangular matrix resulting from equation 7. As will be appreciated, each of these rotations can be implemented conventionally using one or two CORDIC operations.

Figure 6:
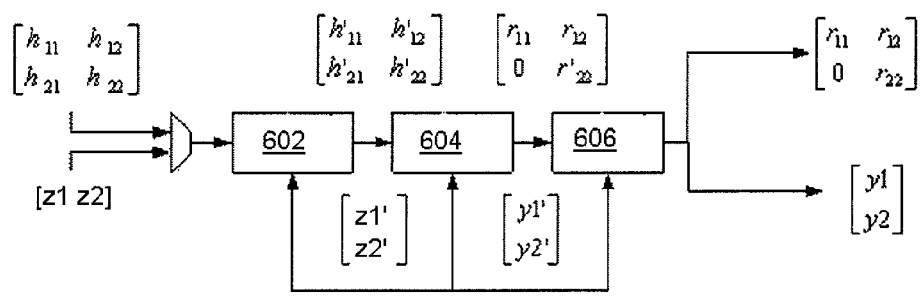
FIG. 6 illustrates an example of the QR decomposition block of FIG. 5 configured for a 2×2 MIMO system, according to the invention.

An exemplary embodiment of the QR decomposition process discussed above is shown in FIG. 6. As shown, the full QR decomposition of a 2×2 MIMO channel matrix is preferably accomplished by three subparts 602, 604 and 606 of QR decomposition function 502. QR subparts perform a full QR decomposition of H 106 (or Hk 404) initially and then, using direction information from those CORDIC rotations, generates y 208 by rotating received symbol vector z 110. First, subpart 602 applies the rotation represented by equation 6, rotating the diagonal elements $h_{11}$ and $h_{21}$ of H to real numbers, $h'_1$ and $h'_{21}$. Subpart 604 rotates the result by applying equation 7 to generate a right triangular matrix, which is then rotated by subpart 606 applying equation 8 to obtain a real value for $r_{22}$, so that the resulting R matrix 206 comprises real, and as a consequence of employing CORDIC algorithms, positive numbers along the diagonal. Next, as indicated in FIG. 6, sign bits of each CORDIC rotation are saved in the memory and then applied to receive symbol vector z 110 to generate modified receive symbol vector y 208.

The above principles can readily be applied to higher order MIMO systems. Again, in preferred embodiments, the QR decomposition can be performed by applying the appropriate CORDIC rotations. For example, in a system having a 3×3 channel estimation matrix, nine CORDIC rotations as shown in equation 9 can be applied to rotate the values to real and to zero, in order to perform the QR decomposition represented by equation 10.

$$\begin{bmatrix} 1 & 0 & 0 \\ 0 & 1 & 0 \\ 0 & 0 & e^{j\theta_9} \end{bmatrix} \cdot \begin{bmatrix} 1 & 0 & 0 \\ 0 & \cos\theta_8 & \sin\theta_8 \\ 0 & -\sin\theta_8 & \cos\theta_8 \end{bmatrix} \cdot \begin{bmatrix} 1 & 0 & 0 \\ 0 & e^{j\theta_6} & 0 \\ 0 & 0 & e^{j\theta_7} \end{bmatrix} \cdot \qquad (9)$$

$$\begin{bmatrix} \cos\theta_5 & 0 & \sin\theta_5 \\ 0 & 1 & 0 \\ -\sin\theta_5 & 0 & \cos\theta_5 \end{bmatrix} \cdot \begin{bmatrix} \cos\theta_4 & \sin\theta_4 & 0 \\ -\sin\theta_4 & \cos\theta_4 & 0 \\ 0 & 0 & 1 \end{bmatrix} \cdot \begin{bmatrix} e^{j\theta_1} & 0 & 0 \\ 0 & e^{j\theta_2} & 0 \\ 0 & 0 & e^{j\theta_3} \end{bmatrix}.$$

$$\begin{bmatrix} h_{11} & h_{12} & h_{13} \\ h_{21} & h_{22} & h_{23} \\ h_{31} & h_{32} & h_{33} \end{bmatrix} = \begin{bmatrix} r_{11} & r_{12} & r_{13} \\ 0 & r_{22} & r_{23} \\ 0 & 0 & r_{33} \end{bmatrix} \qquad (10)$$

Returning to FIG. 5, in some embodiments R 206 and y 208 provided by QR decomposition function 402 can be scaled by weighting vector w 504 as shown. Equation 1 discussed provides a model for MIMO system 100 such that all the noise is introduced on the receiver side, including thermal noise, analog circuit noise, and the like. Under such conditions, the ML determination operations of this disclosure represent the optimal solution. However, as shown by the following equation, noise can also be present on the transmitter side.

$$r = H(s + v_{tx}) \qquad (11)$$

Under this model, the optimal solution is a zero forcing (ZF) equalization:

$$\hat{s}_{ZF} = H^{-1}z = s + v_{tx} \qquad (12)$$

As will be appreciated, however, under real world conditions, it can be anticipated that noise will be present in the system on both the receiver and transmitters sides. Accordingly, z 110 will typically have both transmitter and receiver noise components $$r = H(s + v_{tx}) + v_{rx} \qquad (13)$$

and neither a ML determination nor a ZF equalization will yield the optimal results. It will therefore be appreciated that when transmitter side noise is dominant, using a ZF equalizer is nearly optimal. These conditions occur in relatively infrequent situations corresponding to a relatively poor transmitter error vector magnitude (EVM), such as a bad transmitter at very high signal to noise ratios (SNR). Conversely, when receiver side noise is dominant, for example under low to medium SNRs or with a good transmitter, ML equalization represents the best solution. Finally, when significant noise is present on both the transmitter side and receiver side, the optimal solution is a combination of ZF and ML equalization.

Accordingly, weighting vector w 504 allows the MIMO detection to achieve aspects of both ZF and ML equalization. w 504 is a 1×N column vector $[w_1 \ldots w_{N-1} \ 1]^T$ used to scale the streams of both R 206 and y 208, such that the first through the N−1 values of R and y are scaled by the corresponding value $w_i$ and the last values are unchanged as the last scale value is one. Each value of $w_i$ is positive between zero and one, and preferably, has the same value. When $w_i$ equals zero, the process is equivalent to a ZF equalizer and can be applied when transmission noise is expected to be dominant. When $w_i$ equals one, the process corresponds to the ML determinations described above. Finally, at $w_i$ values between zero and one, the process represents a linear combination of ZF and ML equalization. As will be appreciated, for a given SNR and transmitter EVM, there is a value for w that represents the optimal MIMO detection. In some embodiments, therefore, w 504 is set according to the SNR and EVM conditions experienced by MIMO system 100. For example, an appropriate w can be retrieved from a stored look up table or otherwise configured as desired.

Figure 2:
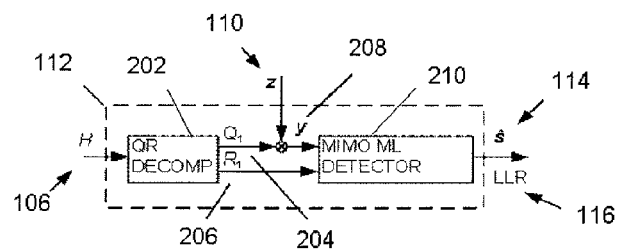
FIG. 2 illustrates an ML detection block using a QR decomposition of an estimated channel matrix, according to the invention.

As indicated in FIG. 2, ML detector 210 also preferably calculates log likelihood ratio soft decision metric 116. To limit the dynamic range of the Viterbi inputs, a normalization of bit LLR can be performed. As known to those of skill in the art, in a noise-free channel, when the hard decision of $s_1$ is correct for an assumed $s_2$, the maximum bit LLR is given by $$\max\_llr = \max_k(|r_{12}(k)| + |r_{22}(k)|) * \max_{s_2, \hat{s}_2}(|\hat{s}_2 - s_2|) \qquad (14)$$

given an error distance calculation based on 1-norm and wherein k is the index of frequency bin. Also, $s_2, \hat{s}_2$ of above equation have the same I (Q) and their Q (I) part belong the same subset (bk=1 or bk=0). The second multiplicative term of the above equation is 2, 4 and 8 for BPSK/QPSK, 16QAM and 64QAM respectively, which corresponds to the maximum distance between two sets of I (Q) parts of $s_2$. This distance is termed "max bit distance" and also represents the bit reliability.

Normalization of bit LLR can be achieved using $2^{vit\_bits/max\_llr}$, where vit_bits represents number of Viterbi soft bits. However, for multi-level modulation, depending on the transmitted $s_2$, the most significant bit (MSB) often has a larger maximum bit distance than either the center significant bit (CSB) or the least significant bit (LSB.) Due to this larger MSB bit distance, two extra bits are needed to quantize the bit LLR of a 64QAM constellation. Therefore, in some embodiments of the disclosure, the max bit distance is saturated to a value of 2 regardless of QAM constellation to avoid the need for extra bits and to foster compatibility with existing Viterbi decoders. Simulations have shown that for 5 soft Viterbi bits, saturation to two results in relatively minor signal degradation, on the order of less than approximately 0.5 dB in a worst case scenario.

As shown in FIG. 5, calculation of an appropriate LLR scaling factor can be determined in block 506 using the QR decomposer 202. For example, as discussed above, a 2×2 MIMO system having a max bit distance saturated to two preferably employs a scaling factor of $$1 / \left( \max_k(|r_{12}(k)| + |r_{22}(k)|) * 2 \right).$$

A similar approach can be employed to determine the appropriate LLR scaling factor for other numbers of transmit and receive antennas or lines 102 and 104.

In a further aspect of the disclosure, FIG. 5 also depicts scaling y 208 by $1/K_{mod}$ to simplify the ML determinations discussed above. As will be appreciated, this scaling operation results in integer values allowing the ML determination using $$\underset{\hat{s} \in C^n}{\operatorname{argmin}} \left\| \frac{y}{K_{mod}} - R_1 \hat{s} \right\|^2 \quad (15)$$

with reduced computational requirements. One of skill in the art will recognize that $K_{mod}$ can be chosen based upon the constellation being employed. For example, a 64QAM system preferably uses a $K_{mod}$ value of $42^{-1/2}$, while 16QAM, QPSK and BPSK preferably use $10^{-1/2}$, $2^{-1/2}$ and 1, respectively. In some embodiments, the division of y 208 by $K_{mod}$ is performed during a final operation of the QR decomposition discussed above, in a CORDIC scaling operation.

Described herein are presently preferred embodiments. However, one skilled in the art that pertains to the present invention will understand that the principles of this disclosure can be extended easily with appropriate modifications to other applications.

What is claimed is:

1. A method of estimating a plurality of transmit symbols $s_i$, i=1 to n, in a transmit symbol vector s of a multiple-input multiple-output (MIMO) communication system, where n is the size of the transmit symbol vector s, the method comprising:
    calculating a plurality of MIMO channel matrices $H_i$, i=1 to n, wherein a rightmost column of the permuted MIMO channel matrix $H_i$ is an ith column of an estimated MIMO channel matrix H with a wireless communications device;
    determining a QR decomposition by rotation of each permuted MIMO channel matrix $H_i$ in the plurality of permuted MIMO channel matrices $H_i$, i=1 to n, to generate a plurality of unitary matrices $Q_i$, i=1 to n, and a plurality of upper triangular matrices $R_i$, i=1 to n, having real values along each diagonal using a series of coordinate rotation digital computer (CORDIC) operations with a wireless communications device; and
    estimating each transmit symbol $s_i$, i=1 to n, of the transmit symbol vector using a modified receive symbol vector y and the upper triangular matrix $R_i$ with a wireless communications device.

2. The method of claim 1, further comprising storing rotations for each CORDIC operation.

3. The method of claim 2, further comprising determining a plurality of modified receive symbol vectors $y_i$, i=1 to n, wherein each modified receive symbol vector $y_i$ is calculated by rotating receive symbol vector z by the stored rotations of each CORDIC operation.

4. The method of claim 1, wherein determining a QR decomposition comprises applying each QR decomposition serially to all frequency bins of a plurality of data streams.

5. The method of claim 1, further comprising calculating a log likelihood ratio (LLR) scaling factor and applying the scaling factor to a soft decision metric set representative of estimated received bit reliability.

6. The method of claim 5, wherein calculating a LLR scaling factor comprises saturating a maximum bit distance.

7. The method of claim 1, further comprising scaling the modified receive symbol vectors $y_i$ and the upper triangular matrices $R_i$ by a weighting vector w configured to compensate for an effect of noise in the MIMO system.

8. The method of claim 7, wherein scaling the modified receive symbol vectors $y_i$ and the upper triangular matrices $R_i$ by the weighting vector w comprises multiplying by a vector w that weights the estimation of the transmit symbol vector s towards a maximum likelihood (ML) equalization when the noise is predominantly present on a receive side of the MIMO system.

9. The method of claim 8, wherein scaling the modified receive symbol vectors $y_i$ and the upper triangular matrices $R_i$ by the weighting vector w comprises multiplying by a vector w that weights the estimation of the transmit symbol vector s towards a zero forcing (ZF) equalization when the noise is predominantly present on a transmit side of the MIMO system.

10. An apparatus for estimating a plurality of transmit symbols $s_i$, i=1 to n, in a transmit symbol vectors of a multiple-input multiple-output (MIMO) communication system, where n is the size of the transmit symbol vector s, the apparatus comprising:
    a permutation processor to calculate a plurality of permuted MIMO channel matrices $H_i$, i=1 to n, wherein a rightmost column of the permuted MIMO channel matrix $H_i$ is an ith column of an estimated MIMO channel matrix H;
    a decomposition processor to determine a QR decomposition by rotation of each permuted MIMO channel matrix $H_i$ in the plurality of permuted MIMO channel matrices $H_i$, i=1 to n, to generate a plurality of unitary matrices $Q_i$, i=1 to n by performing a series of CORDIC operations, and a plurality of upper triangular matrices $R_i$, i=1 to n, having real values along each diagonal; and
    an estimator to estimate each transmit symbol $s_i$, i=1 to n, of the transmit symbol vector s using a modified receive symbol vector $y_i$ and the upper triangular matrix $R_i$.

11. The apparatus of claim 10, wherein the decomposition processor stores rotations for each CORDIC operation.

12. The apparatus of claim 11, further comprising a calculator to determine a plurality of modified receive symbol vectors $y_i$, i=1 to n, wherein each modified receive symbol vector $y_i$ is calculated by rotating receive symbol vector z by the stored rotations of each CORDIC operation.

13. The apparatus of claim 10, wherein the decomposition processor applies each QR decomposition serially to all frequency bins of a plurality of data streams.

14. The apparatus of claim 10, further comprising a LLR scaling factor calculator to determine a log likelihood ratio (LLR) scaling factor and apply the LLR scaling factor to a soft decision metric set representative of estimated received bit reliability.

15. The apparatus of claim 14, wherein the LLR scaling factor calculator determines a LLR scaling by saturating a maximum bit distance.

16. The apparatus of claim 10, wherein the calculator scales the modified receive symbol vectors $y_i$ and the upper triangular matrices $R_i$ by a weighting vector w that compensates for an effect of noise in the MIMO system.

17. The apparatus of claim 16, wherein the calculator scales the modified receive symbol vectors $y_i$ and the upper triangular matrices $R_i$ by the weighting vector w comprises multiplying by a vector w that weights the estimation of the transmit symbol vector s towards a maximum likelihood (ML) equalization when the noise is predominantly present on a receive side of the MIMO system.

18. The apparatus of claim 16, wherein the calculator scales the modified receive symbol vectors $y_i$ and the upper triangular matrices $R_i$ by the weighting vector w comprises multiplying by a vector w that weights the estimation of the transmit symbol vector s towards a towards a zero forcing (ZF) equalization when the noise is predominantly present on a transmit side of the MIMO system.

* * * * *